US011171755B2

(12) United States Patent
Su et al.

(10) Patent No.: US 11,171,755 B2
(45) Date of Patent: Nov. 9, 2021

(54) COMMUNICATION METHOD AND COMMUNICATIONS DEVICE

(71) Applicant: HUAWEI TECHNOLOGIES CO., LTD., Guangdong (CN)

(72) Inventors: Liyan Su, Beijing (CN); Chaojun Li, Beijing (CN); Zuomin Wu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/536,566

(22) Filed: Aug. 9, 2019

(65) Prior Publication Data
US 2019/0363856 A1 Nov. 28, 2019

Related U.S. Application Data

(63) Continuation of application No. PCT/CN2017/073253, filed on Feb. 10, 2017.

(51) Int. Cl.
H04L 5/00 (2006.01)
H04W 72/04 (2009.01)

(52) U.S. Cl.
CPC .......... *H04L 5/0053* (2013.01); *H04L 5/0007* (2013.01); *H04W 72/042* (2013.01); *H04W 72/0446* (2013.01)

(58) Field of Classification Search
CPC ... H04L 5/0053; H04L 5/0007; H04W 72/042
(Continued)

(56) References Cited

U.S. PATENT DOCUMENTS

2013/0114517 A1* 5/2013 Blankenship ......... H04L 5/0053
370/329
2016/0227520 A1* 8/2016 Davydov ................. H04L 5/00
(Continued)

FOREIGN PATENT DOCUMENTS

CN 106028454 A 10/2016
CN 106131963 A 11/2016
(Continued)

OTHER PUBLICATIONS

ETSI TS 136 213 V13.1.1 (May 2016), "LTE; Evolved Universal Terrestrial Radio Access (E-UTRA); Physical layer procedures (3GPP TS 36.213 version 13.1.1 Rele—*ase 13)," May 2016, 363 pages.

(Continued)

Primary Examiner — Faisal Choudhury
(74) Attorney, Agent, or Firm — Fish & Richardson P.C.

(57) ABSTRACT

The present disclosure relates to communication methods and devices. One example method includes determining that a downlink bandwidth belongs to one of N downlink bandwidth sets, where each downlink bandwidth set of the N downlink bandwidth sets corresponds to one first value and one second value, at least two first values corresponding to at least two downlink bandwidth sets of the N downlink bandwidth sets are different, each downlink bandwidth set of the N downlink bandwidth sets corresponds to a same second value, the second value is a common divisor of N first values corresponding to the N downlink bandwidth sets, determining that a quantity of resource blocks included in a first resource block group is a first value corresponding to the downlink bandwidth set to which the downlink bandwidth belongs, and determining that a quantity of resource blocks included in a precoding resource block group is the second value.

20 Claims, 6 Drawing Sheets

(58) Field of Classification Search
USPC .......................................................... 370/336
See application file for complete search history.

(56) References Cited

U.S. PATENT DOCUMENTS

| | | | |
|---|---|---|---|
| 2017/0078126 A1* | 3/2017 | Einhaus | H04W 72/042 |
| 2017/0318565 A1* | 11/2017 | Golitschek Edler von Elbwart | H04W 72/042 |
| 2018/0020433 A1* | 1/2018 | Lee | H04B 7/0452 |
| 2018/0242283 A1* | 8/2018 | Feng | H04W 74/0808 |
| 2018/0310280 A1 | 10/2018 | Byun et al. | |
| 2018/0343611 A1* | 11/2018 | Jiao | H04W 16/10 |
| 2019/0116594 A1* | 4/2019 | Kwak | H04W 72/0453 |
| 2019/0363849 A1* | 11/2019 | Kim | H04W 72/04 |

FOREIGN PATENT DOCUMENTS

| | | |
|---|---|---|
| EP | 2775653 A1 | 9/2014 |
| WO | 2011161907 A1 | 12/2011 |
| WO | 2015149213 A1 | 10/2015 |
| WO | 2016086981 A1 | 6/2016 |
| WO | 2017000307 A1 | 1/2017 |
| WO | 2017010633 A1 | 1/2017 |

OTHER PUBLICATIONS

Motorola Mobility, Lenovo, "sTTI scheduling," 3GPP TSG RAN WG1#88, R1-1703038, Athens, Greece, Feb. 13-17, 2017, 5 pages.
Office Action issued in Korean Application No. 2019-7026355 dated Aug. 27, 2020, 11 pages (with English translation).
Extended European Search Report issued in European Application No. 17895926.8 dated Jan. 17, 2020, 7 pages.
R1-1610324—Ericsson, "DL control for short TTI," 3GPP TSG-RAN WG1 #86 bis, Lisbon, Portugal, Oct. 10-14, 2016, 8 pages.
R1-1609914—Motorola Mobility, "Shortened TTI design," 3GPP TSG RAN WG1#86bis, Lisbon, Portugal, Oct. 10-14, 2016, 5 pages.
3GPP TS 36.212 V14.1.1 (Jan. 2017), "3rd Generation Partnership Project; Technical Specification Group Radio Access Network; Evolved Universal Terrestrial Radio Access (E-UTRA); Multiplexing and channel coding (Release 14)," Jan. 2017, 149 pages.
3GPP TS 36.213 V14.1.0 (Dec. 2016), "3rd Generation Partnership Project; Technical Specification Group Radio Access Network; Evolved Universal Terrestrial Radio Access (E-UTRA); Physical layer procedures (Release 14)," Dec. 2016, 414 pages.
3GPP TS 36.331 V14.1.0 (Dec. 2016), "3rd Generation Partnership Project; Technical Specification Group Radio Access Network; Evolved Universal Terrestrial Radio Access (E-UTRA); Radio Resource Control (RRC); Protocol specification (Release 14)," Dec. 2016, 653 pages.
R1-101740—Ericsson, ST-Ericsson, "Further discussion on PRB bundling," 3GPP TSG-RAN WG1 #60bis, Beijing, China, Apr. 12-16, 2010, 2 pages.
R1-167490,—Ericsson, "Design aspects of sPDSCH," 3GPP TSG-RAN WG1 #86, Göteborg, Sweden, Aug. 22-26, 2016, 4 pages.
PCT International Search Report and Written Opinion issued in International Application No. PCT/CN2017/073253 dated Nov. 3, 2017, 20 pages (with English translation).
Huawei et al., "Discussion on sPDSCH design," 3GPP TSG RAN WG1 Meeting #88, R1-1701735, Athens, Greece, Feb. 13-17, 2017, 6 pages.
Huawei et al., "sPDSCH design," 3GPP TSG RAN WG1 Meeting #89, R1-1706994, Hangzhou, China, May 15-19, 2017, 4 pages.
Office Action issued in Japanese Application No. 2019-543322 dated Nov. 9, 2020, 9 pages (with English translation).
Office Action issued in Chinese Application No. 201780086154.9 dated Mar. 2, 2021, 6 pages.
Nokia et al., "On details of DMRS design for 2-OS DL shorter TTI," 3GPP TSG-RAN WG1 Meeting #88, R1-1702016 , Athens, Greece, Feb. 13-17, 2017, 4 pages.
Office Action issued in Korean Application No. 2019-7026355 dated Feb. 3, 2021, 2 pages.
Samsung, "PRG options of dynamic selection of PRG for NR DMRS," 3GPP TSG RAN WG1 Meeting #88, R1-1702912, Athens, Greece, Feb. 13-17, 2017, 4 pages.

* cited by examiner

A network device determines that a downlink bandwidth belongs to one of N downlink bandwidth sets, where each of the N downlink bandwidth sets is corresponding to one first value and one second value, at least two first values corresponding to at least two of the N downlink bandwidth sets are different, each of the N downlink bandwidth sets is corresponding to a same second value, the second value is a common divisor of N first values corresponding to the N downlink bandwidth sets, and N is an integer greater than or equal to 2  S401

The network device determines that a quantity of resource blocks included in a first resource block group is a first value corresponding to the downlink bandwidth set to which the downlink bandwidth belongs, and the network device determines that a quantity of resource blocks included in a precoding resource block group is the second value  S402

The network device sends downlink control information, where the downlink control information includes downlink resource allocation information, and the downlink resource allocation information indicates a first resource block group occupied by downlink data  S403

The network device sends a demodulation reference signal and the downlink data, where same precoding is performed on the demodulation reference signal and the downlink data in each precoding resource block group occupied by the downlink data  S404

FIG. 4

A terminal device determines that a downlink bandwidth belongs to one of N downlink bandwidth sets, where each of the N downlink bandwidth sets is corresponding to one first value and one second value, at least two first values corresponding to at least two of the N downlink bandwidth sets are different, each of the N downlink bandwidth sets is corresponding to a same second value, the second value is a common divisor of N first values corresponding to the N downlink bandwidth sets, and N is an integer greater than or equal to 2  S501

The terminal device determines that a quantity of resource blocks included in a first resource block group is a first value corresponding to the downlink bandwidth set to which the downlink bandwidth belongs, and the terminal device determines that a quantity of resource blocks included in a precoding resource block group is the second value 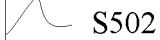 S502

The terminal device receives downlink control information, where the downlink control information includes downlink resource allocation information, and the downlink resource allocation information indicates a first resource block group occupied by downlink data  S503

The terminal device receives a demodulation reference signal and the downlink data, where same precoding is performed on the demodulation reference signal and the downlink data in each precoding resource block group occupied by the downlink data  S504

FIG. 5

COMMUNICATION METHOD AND COMMUNICATIONS DEVICE

CROSS-REFERENCE TO RELATED APPLICATIONS

This application is a continuation of International Application No. PCT/CN2017/073253, filed on Feb. 10, 2017, the disclosure of which is hereby incorporated by reference in its entirety.

TECHNICAL FIELD

The present invention relates to the field of communications technologies, and more specifically, to a communication method and a communications device.

BACKGROUND

In a Long Term Evolution (Long Term Evolution, LTE) system, uplink and downlink transmission between a network device and a terminal device is in units of subframes (subframe). Before downlink data transmission (that is, the network device sends downlink data to the terminal device), the network device needs to send downlink control information (downlink control information, DCI) to the terminal device on the first several orthogonal frequency division multiplexing (orthogonal frequency division multiplexing, OFDM) symbols in a subframe, to notify the terminal device of scheduling information of the current data transmission, including a time-frequency resource and a modulation and coding scheme that are to be used, and the like.

In addition, in a wireless communications system, a latency (latency) is one of important factors affecting user experience. Constantly emerging new services, for example, services related to the Internet of Vehicles, impose an increasingly high requirement on the latency. Therefore, in the LTE system, a transmission mechanism using a transmission time interval (transmission time interval, TTI) as one subframe cannot meet a requirement of a low-latency service. To reduce the latency, a latency reduction (latency reduction) technology is introduced into the 3GPP Release 14 (Release 14) to obtain a shortened transmission time interval (shortened TTI, sTTI), so as to reduce time of packet assembling and demodulation and coding, and reduce a physical-layer air interface latency.

However, DCI overheads are increased due to the shortened transmission time interval. For example, in the LTE system, one piece of DCI may be used to schedule a resource that is within 1 ms, but in an sTTI system, one piece of DCI may be used to schedule a resource of two or three OFDM symbols. Consequently, the DCI overheads are exponentially increased in the sTTI system. Because the exponentially increased DCI overheads occupy excessive transmission resources between the network device and the terminal device, data transmission efficiency is reduced. Therefore, how to reduce a quantity of bits of the DCI in the sTTI system becomes an urgent problem to be resolved.

SUMMARY

To resolve the foregoing problem, this application provides a communication method and a communications device. This method can reduce a quantity of bits of DCI, and reduce DCI overheads in downlink transmission of a network device in an sTTI system, thereby improving data transmission efficiency of the network device.

A first aspect of this application provides a communication method. The method includes: determining, by a network device, that a downlink bandwidth belongs to one of N downlink bandwidth sets, where each of the N downlink bandwidth sets is corresponding to one first value and one second value, at least two first values corresponding to at least two of the N downlink bandwidth sets are different, each of the N downlink bandwidth sets is corresponding to a same second value, the second value is a common divisor of N first values corresponding to the N downlink bandwidth sets, and N is an integer greater than or equal to 2;

determining, by the network device, that a quantity of resource blocks included in a first resource block group is a first value corresponding to the downlink bandwidth set to which the downlink bandwidth belongs, and determining, by the network device, that a quantity of resource blocks included in a precoding resource block group is the second value;

sending, by the network device, downlink control information, where the downlink control information includes downlink resource allocation information, and the downlink resource allocation information indicates a first resource block group occupied by downlink data; and sending, by the network device, a demodulation reference signal and the downlink data, where same precoding is performed on the demodulation reference signal and the downlink data in each precoding resource block group occupied by the downlink data.

In a possible implementation, bandwidth sets in the N downlink bandwidth sets are continuous. For example, three bandwidth sets separately include 11 to 26 resource blocks, 27 to 63 resource blocks, and 64 to 110 resource blocks, and a case in which two bandwidth sets separately include 11 to 26 resource blocks and 64 to 110 resource blocks, in other words, the bandwidth sets are not continuous does not exist.

In a possible implementation, elements in each bandwidth set in the N downlink bandwidth sets are also continuous. For example, a bandwidth set includes 11 to 26 resource blocks, and a case in which a bandwidth set includes 11 to 20 and 22 to 26 resource blocks, in other words, elements in the bandwidth set are not continuous does not exist.

In a possible implementation, when any bandwidth in any one of the N downlink bandwidth sets is greater than a preset bandwidth threshold, and a time domain resource occupied by the downlink data is a first time length, the first value is a common multiple of a quantity of resource blocks in a second resource block group and the second value for a same downlink bandwidth set; and the second resource block group is a resource block group in which a transmission time interval is a second time length, the first value is a quantity of resource blocks in a resource block group in which a transmission time interval is the first time length, and the first time length is less than the second time length.

In a possible implementation, the preset bandwidth threshold is 10 resource blocks, the first time length includes two orthogonal frequency division multiplexing OFDM symbols or three OFDM symbols or seven OFDM symbols, and the second time length is one millisecond; the N downlink bandwidth sets include a first bandwidth set, a second bandwidth set, and a third bandwidth set, the first bandwidth set includes 11 to 26 resource blocks, the second bandwidth set includes 27 to 63 resource blocks, and the third bandwidth set includes 64 to 110 resource blocks; and when the second value is 3, a first value corresponding to the first bandwidth set is six resource blocks, a first value corresponding to the second bandwidth set is nine resource blocks, and a first value corresponding to the third bandwidth set is 12 resource blocks.

In a possible implementation, the preset bandwidth threshold is 10 resource blocks, the first time length includes two orthogonal frequency division multiplexing OFDM symbols or three OFDM symbols or seven OFDM symbols, and the second time length is one millisecond; the N downlink bandwidth sets include a first bandwidth set, a second bandwidth set, and a third bandwidth set, the first bandwidth set includes 11 to 26 resource blocks, the second bandwidth set includes 27 to 63 resource blocks, and the third bandwidth set includes 64 to 110 resource blocks; and when the second value is 3, a resource block group with the second time length in the first bandwidth set includes two resource blocks, a resource block group with the second time length in the second bandwidth set includes three resource blocks, and a resource block group with the second time length in the third bandwidth set includes four resource blocks.

In a possible implementation, the preset bandwidth threshold is 10 resource blocks, the first time length includes two OFDM symbols or three OFDM symbols or seven OFDM symbols, and the second time length is one millisecond; the N downlink bandwidth sets include a fourth bandwidth set and a fifth bandwidth set, the fourth bandwidth set includes 11 to 63 resource blocks, and the fifth bandwidth set includes 64 to 110 resource blocks; and when the second value is 6, a first value corresponding to the fourth bandwidth set is six resource blocks, and a first value corresponding to the fifth bandwidth set is 12 resource blocks.

In a possible implementation, the preset bandwidth threshold is 10 resource blocks, the first time length includes two OFDM symbols or three OFDM symbols or seven OFDM symbols, and the second time length is one millisecond; the N downlink bandwidth sets include a fourth bandwidth set and a fifth bandwidth set, the fourth bandwidth set includes 11 to 63 resource blocks, and the fifth bandwidth set includes 64 to 110 resource blocks; and when the second value is 6, a resource block group with the second time length in the fourth bandwidth set includes two or three resource blocks, and a resource block group with the second time length in the fifth bandwidth set includes four resource blocks.

In a possible implementation, N is a positive integer greater than or equal to 3.

A second aspect of this application provides a communication method. The method includes: determining, by a terminal device, that a downlink bandwidth belongs to one of N downlink bandwidth sets, where each of the N downlink bandwidth sets is corresponding to one first value and one second value, at least two first values corresponding to at least two of the N downlink bandwidth sets are different, each of the N downlink bandwidth sets is corresponding to a same second value, the second value is a common divisor of N first values corresponding to the N downlink bandwidth sets, and N is an integer greater than or equal to 2;

determining, by the terminal device, that a quantity of resource blocks included in a first resource block group is a first value corresponding to the downlink bandwidth set to which the downlink bandwidth belongs, and determining, by the terminal device, that a quantity of resource blocks included in a precoding resource block group is the second value;

receiving, by the terminal device, downlink control information, where the downlink control information includes downlink resource allocation information, and the downlink resource allocation information indicates a first resource block group occupied by downlink data; and receiving, by the terminal device, a demodulation reference signal and the downlink data, where same precoding is performed on the demodulation reference signal and the downlink data in each precoding resource block group occupied by the downlink data.

In a possible implementation, when any bandwidth in any one of the N downlink bandwidth sets is greater than a preset bandwidth threshold, and a time domain resource occupied by the downlink data is a first time length, the first value is a common multiple of a quantity of resource blocks in a second resource block group and the second value for a same downlink bandwidth set; and the second resource block group is a resource block group in which a transmission time interval is a second time length, the first value is a quantity of resource blocks in a resource block group in which a transmission time interval is the first time length, and the first time length is less than the second time length.

In a possible implementation, the preset bandwidth threshold is 10 resource blocks, the first time length includes two orthogonal frequency division multiplexing OFDM symbols or three OFDM symbols or seven OFDM symbols, and the second time length is one millisecond; the N downlink bandwidth sets include a first bandwidth set, a second bandwidth set, and a third bandwidth set, the first bandwidth set includes 11 to 26 resource blocks, the second bandwidth set includes 27 to 63 resource blocks, and the third bandwidth set includes 64 to 110 resource blocks; and when the second value is 3, a first value corresponding to the first bandwidth set is six resource blocks, a first value corresponding to the second bandwidth set is nine resource blocks, and a first value corresponding to the third bandwidth set is 12 resource blocks.

In a possible implementation, the preset bandwidth threshold is 10 resource blocks, the first time length includes two orthogonal frequency division multiplexing OFDM symbols or three OFDM symbols or seven OFDM symbols, and the second time length is one millisecond; the N downlink bandwidth sets include a first bandwidth set, a second bandwidth set, and a third bandwidth set, the first bandwidth set includes 11 to 26 resource blocks, the second bandwidth set includes 27 to 63 resource blocks, and the third bandwidth set includes 64 to 110 resource blocks; and when the second value is 3, a resource block group with the second time length in the first bandwidth set includes two resource blocks, a resource block group with the second time length in the second bandwidth set includes three resource blocks, and a resource block group with the second time length in the third bandwidth set includes four resource blocks.

In a possible implementation, the preset bandwidth threshold is 10 resource blocks, the first time length includes two OFDM symbols or three OFDM symbols or seven OFDM symbols, and the second time length is one millisecond; the N downlink bandwidth sets include a fourth bandwidth set and a fifth bandwidth set, the fourth bandwidth set includes 11 to 63 resource blocks, and the fifth bandwidth set includes 64 to 110 resource blocks; and when the second value is 6, a first value corresponding to the fourth bandwidth set is six resource blocks, and a first value corresponding to the fifth bandwidth set is 12 resource blocks.

In a possible implementation, the preset bandwidth threshold is 10 resource blocks, the first time length includes two OFDM symbols or three OFDM symbols or seven OFDM symbols, and the second time length is one millisecond; the N downlink bandwidth sets include a fourth bandwidth set and a fifth bandwidth set, the fourth bandwidth set includes 11 to 63 resource blocks, and the fifth bandwidth set includes 64 to 110 resource blocks; and when the second value is 6, a resource block group with the second time length in the fourth bandwidth set includes two or three resource blocks, and a resource block group with the second time length in the fifth bandwidth set includes four resource blocks.

In a possible implementation, N is a positive integer greater than or equal to 3.

According to another aspect, an embodiment of the present invention provides a terminal device. The terminal device can implement a function performed by the terminal device in the foregoing implementations. The function may be implemented by hardware, or may be implemented by hardware executing corresponding software. The hardware or software includes one or more modules corresponding to the foregoing function.

In a possible design, a structure of the terminal device includes a processor and a transceiver. The processor is configured to support the terminal device in performing a corresponding function in the foregoing method. The transceiver is configured to support communication between the terminal device and a network device. The terminal device may further include a memory. The memory is configured to be coupled to the processor, and store program instructions and data that are necessary for the terminal device.

According to another aspect, an embodiment of the present invention provides a network device. The network device has a function of implementing a behavior of the network device in the foregoing implementations. The function may be implemented by hardware, or may be implemented by hardware executing corresponding software. The hardware or software includes one or more modules corresponding to the foregoing function.

In a possible design, the network device includes a processor. The processor is configured to support the network device in performing a corresponding function in the foregoing method. Further, the network device may include a communications interface. The communications interface is configured to support communication with a terminal device. Further, the network device may include a memory. The memory is configured to be coupled to the processor, and store program instructions and data that are necessary for the network device.

According to another aspect, an embodiment of the present invention provides a computer storage medium, configured to store computer software instructions used by the foregoing terminal device, and the computer software instructions include a program designed to execute the foregoing aspect.

According to another aspect, an embodiment of the present invention provides a computer storage medium, configured to store computer software instructions used by the foregoing network device, and the computer software instructions include a program designed to execute the foregoing aspect.

According to another aspect, an embodiment of the present invention provides a computer program product that includes instructions, and when the instructions are executed by a computer, the instructions enables the computer to perform a function performed by the terminal device in the foregoing method design.

According to another aspect, an embodiment of the present invention provides a computer program product that includes instructions, and when the instructions are executed by a computer, the instructions enables the computer to perform a function performed by the network device in the foregoing method design.

In the embodiments of the present invention, quantities of precoding resource blocks in various bandwidths are set to be the same, and a quantity of resource blocks in a resource block group is increased, so that not only a transmission time interval is shortened, but also a quantity of bits occupied by the downlink control information is reduced, thereby reducing overheads of the downlink control information of the network device, and improving data transmission efficiency of the network device.

BRIEF DESCRIPTION OF DRAWINGS

FIG. 4 is a schematic flowchart of a communication method according to an embodiment of the present invention;

FIG. 5 is a schematic flowchart of another communication method according to an embodiment of the present invention;

DESCRIPTION OF EMBODIMENTS

Figure 1:
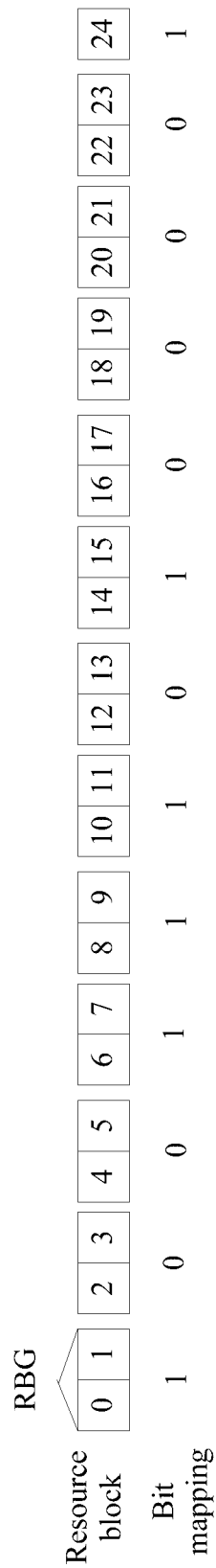
FIG. 1 is a schematic diagram of downlink resource allocation in the prior art.

The following describes the technical solutions in the embodiments of the present invention with reference to the accompanying drawings in the embodiments of the present invention.

The terms used in the embodiments of the present invention are merely for the purpose of illustrating specific embodiments, and are not intended to limit the present invention. The terms "a" and "the" of singular forms used in the embodiments and the appended claims of the present invention are also intended to include plural forms, unless otherwise specified in the context clearly. It should be further understood that "first" and "second" in this specification are also intended to distinguish between technical terms during description, to facilitate understanding by a user, and should not be construed as a limitation on the technical terms.

A terminal device (terminal equipment) in the embodiments of the present invention may also be referred to as user equipment (user equipment, UE). The terminal device may include a mobile phone, a tablet computer, a personal digital assistant (personal digital assistant, PDA), a point of sale (point of sales, POS), an in-vehicle computer, and the like. This is not limited in the embodiments of the present invention. For ease of description, the foregoing devices are collectively described as the terminal device in the embodiments of the present invention.

A network device includes an access network device and a core network device. The access network device may be an apparatus that is deployed in a radio access network and that is configured to provide a wireless communication function for a terminal device or a relay terminal device. The apparatus may include a macro eNodeB (macro eNodeB, MeNB), a micro eNodeB (small eNodeB, SeNB), a relay node, an access point (access node, AN), and the like in various forms. In systems that use different radio access technologies, a device with a base station function may be named differently. For example, in an LTE network, the device is referred to as an evolved NodeB (evolved NodeB, eNB or eNodeB), and in a 3G network, the device is referred to as a NodeB (NodeB), or the like. The core network device includes a user plane function (user plane function, UP) entity and a control plane function (control plane function, CP) entity. For ease of description, the access network device and the core network device are collectively referred to as the network device in the embodiments of the present invention.

In an LTE system, various physical channels are designed based on a TTI length of one millisecond.

It should be noted that although the TTI length is one millisecond, a time domain resource occupied by data transmission may be less than one millisecond. For example, the first 1, 2, 3, or 4 symbols in one downlink subframe may be used to transmit a downlink control channel. Therefore, a time domain resource occupied by downlink data transmission in which a TTI length is one millisecond may be less than one millisecond. sTTI data transmission means that a TTI length for data transmission is less than one subframe or one millisecond. For example, a short TTI length is 0.5 millisecond, four symbols, three symbols, two symbols, or one symbol. In other words, in the embodiments of the present invention, a time domain resource occupied by data transmission in an sTTI system may also be less than the sTTI length.

In addition, in the LTE system, a relationship among a downlink bandwidth, a resource block group (resource block group, RBG), and a precoding resource block group (precoder resource block group, PRG) is shown in Table 1:

TABLE 1

| Downlink bandwidth (RB) | RBG size (RB) | Bit mapping | PRG size (RB) |
| --- | --- | --- | --- |
| ≤10 | 1 | ≤10 | 1 |
| 11 to 26 | 2 | 6 to 13 | 2 |
| 27 to 63 | 3 | 9 to 21 | 3 |
| 64 to 110 | 4 | 16 to 28 | 2 |

As shown in Table 1, if an RBG size in the LTE system is applied to the sTTI system, a larger quantity of bits are occupied by a downlink resource allocation type 0 due to a relatively small RBG size. In addition, due to the RBG size, PRG sizes cannot be unified into a same size in different bandwidths. In this case, for each PRG size, a corresponding implementation algorithm is required. Consequently, implementation complexity of the network device or the terminal device is increased, and terminal estimation performance deteriorates.

It should be noted that downlink resource allocation in the LTE system is classified into three types: a type 0, a type 1, and a type 2. The embodiments of the present invention are mainly described by using the type 0 as an example.

Each RBG is a group of continuous resource blocks, there are P resource blocks in each RBG, and a value of P is related to the downlink bandwidth. In addition, if P cannot be exactly divided by the bandwidth, a quantity of resource blocks in the last RBG is less than P. In addition, in the downlink resource allocation type 0, the network device indicates, by using a bit mapping scheme, a frequency domain resource allocated to the terminal device. A quantity of bits required according to the bit mapping scheme is the same as a quantity of RBGs, and each bit is corresponding to one RBG If the network device allocates one RBG to a terminal device, a corresponding bit in bit mapping is set to 1; or if the network device does not allocate one RBG to a terminal device, a corresponding bit in bit mapping is set to 0.

FIG. 1 is a schematic diagram of downlink resource allocation in the prior art. As shown in FIG. 1, using a bandwidth of 25 resource blocks (resource block, RB) as an example, if P=2, the bandwidth is divided into 13 RBGs, each of the first 12 RBGs includes two RBs, and the thirteenth RBG includes one resource block.

In addition, a non-codebook precoding transmission scenario is supported in downlink transmission in an LTE system. In this case, a network device performs channel estimation by using a demodulation reference signal (demodulation reference signal, DMRS), and the DMRS is transmitted only on a resource block allocated to a specific terminal device, and is valid only for the specific terminal. In other words, each DMRS can be used only for a single terminal device, and DMRSs between different terminal devices are different (or distinguishable). Same precoding is performed on the DMRS and a physical downlink shared channel (physical downlink shared channel, PDSCH) for transmission.

Figure 2:
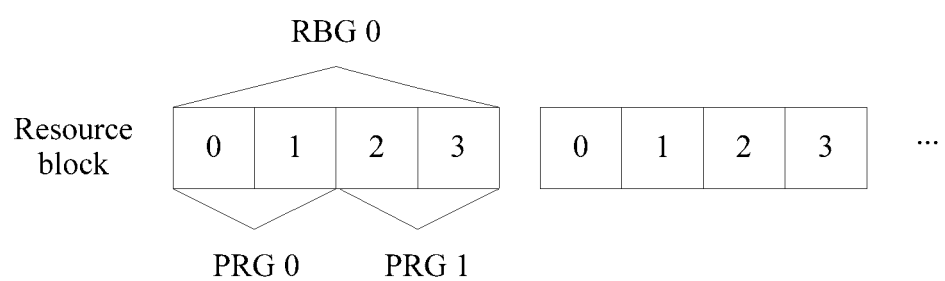
FIG. 2 is a schematic diagram of a precoding resource block group in the prior art.

If non-codebook precoding is performed on the PDSCH, the network device can determine precoding performed by each terminal device on each RB. However, in most cases, the network device may use a same precoding matrix for a plurality of continuous RBs to improve terminal channel estimation quality. The 3GPP Release 10 stipulates that it is assumed that a terminal device can perform same precoding on all RBs in one PRG In a downlink resource allocation type 0, data sent by the network device to the terminal device is carried on one or more RBGs, and a PRG size is a divisor of an RBG size, in other words, a quantity of RBs in the PRG is a divisor of a quantity of RBs in the RBG FIG. 2 is a schematic diagram of a precoding resource block group in the prior art. As shown in FIG. 2, a bandwidth is 100 RBs, and an RBG 0 includes a PRG 0 and a PRG 1. Same precoding is performed on RBs in the PRG 0, and same precoding is also performed on RBs in the PRG 1. A terminal device may perform joint channel estimation on channels in each PRG A specific performance gain is obtained compared with performing channel estimation on each RB.

In addition, one RBG may be equally divided into a plurality of PRGs, and same precoding or different precoding may be performed on the plurality of PRGs. This is not described in detail in this embodiment of the present invention.

FIG. 4 is a schematic flowchart of a communication method according to an embodiment of the present invention. As shown in FIG. 4, the method includes step S401 and step S402.

S401. A network device determines that a downlink bandwidth belongs to one of N downlink bandwidth sets, where each of the N downlink bandwidth sets is corresponding to one first value and one second value, at least two first values corresponding to at least two of the N downlink bandwidth sets are different, each of the N downlink bandwidth sets is corresponding to a same second value, the second value is a common divisor of N first values corresponding to the N downlink bandwidth sets, and N is an integer greater than or equal to 2.

It should be noted that an element in the downlink bandwidth set is a positive integer. For example, an element in one downlink bandwidth set is 6, in other words, the downlink bandwidth set includes six RBs.

In addition, in an example, when N is greater than or equal to 3, the N downlink bandwidth sets include a first downlink bandwidth set, a second downlink bandwidth set, and a third downlink bandwidth set, the first downlink bandwidth set includes an element 19, the second downlink bandwidth set includes an element 39, and the third downlink bandwidth set includes an element 79.

S402. The network device determines that a quantity of resource blocks included in a first resource block group is a first value corresponding to the downlink bandwidth set to which the downlink bandwidth belongs, and the network device determines that a quantity of resource blocks included in a precoding resource block group is the second value.

In this case, when any downlink bandwidth in the N downlink bandwidth sets is greater than a preset bandwidth threshold, and a time domain resource occupied by downlink data is a first time length, the first value is a common multiple of a quantity of resource blocks in a second resource block group and the second value for a same downlink bandwidth set.

The second resource block group is a resource block group in which a transmission time interval is a second time length, the first value is a quantity of resource blocks in a resource block group in which a transmission time interval is the first time length, and the first time length is less than the second time length.

In a possible implementation, bandwidth sets in the N downlink bandwidth sets are continuous. For example, three bandwidth sets separately include 11 to 26 resource blocks, 27 to 63 resource blocks, and 64 to 110 resource blocks, and a case in which two bandwidth sets separately include 11 to 26 resource blocks and 64 to 110 resource blocks, in other words, the bandwidth sets are not continuous does not exist.

In a possible implementation, elements in each bandwidth set in the N downlink bandwidth sets are also continuous. For example, a bandwidth set includes 11 to 26 resource blocks, and a case in which a bandwidth set includes 11 to 20 and 22 to 26 resource blocks, in other words, elements in the bandwidth set are not continuous does not exist.

In a possible implementation, N is a positive integer greater than or equal to 3.

In an example, the preset bandwidth threshold is 10 resource blocks, the first time length includes two OFDM symbols or three OFDM symbols or seven OFDM symbols, and the second time length is one millisecond. In this case, the N downlink bandwidth sets include a first bandwidth set, a second bandwidth set, and a third bandwidth set, the first bandwidth set includes 11 to 26 resource blocks, the second bandwidth set includes 27 to 63 resource blocks, and the third bandwidth set includes 64 to 110 resource blocks.

When the second value is 3, in other words, the precoding resource block group includes three resource blocks, a first value corresponding to the first bandwidth set is 6, and a resource block group with the second time length includes two resource blocks; a first value corresponding to the second bandwidth set is 9, and a resource block group with the second time length includes three resource blocks; and a first value corresponding to the third bandwidth set is 12, and a resource block group with the second time length includes four resource blocks.

In this embodiment of the present invention, a transmission time interval in an LTE system is the second time length, and a transmission time interval in an sTTI system is the first time length. Table 2 is shown below:

TABLE 2

| Downlink bandwidth (RB) | RBG size P (RB) | | PRG size K (RB) | | Quantity of bits for bit mapping | |
|---|---|---|---|---|---|---|
| | LTE system | sTTI system | LTE system | sTTI system | LTE system | sTTI system |
| 11 to 26 | 2 | 6 | 2 | 3 | 6 to 13 | 2 to 5 |
| 27 to 63 | 3 | 9 | 3 | 3 | 9 to 21 | 3 to 7 |
| 64 to 110 | 4 | 12 | 2 | 3 | 16 to 28 | 6 to 10 |

As shown in Table 2, in the sTTI system, the network device determines that the PRG size, namely, the second value is 3. When the downlink bandwidth is 11 to 26 RBs, the second resource block group includes two resource blocks, and the first value is 6. In this case, 6 is a common multiple of the quantity 2 of resource blocks in the second resource block group and the second value 3. When the downlink bandwidth is 27 to 63 RBs, the second resource block group includes three resource blocks, and the first value is 9. In this case, 9 is a common multiple of the quantity 3 of resource blocks in the second resource block group and the second value 3. When the downlink bandwidth is 64 to 110 RBs, the second resource block group includes four resource blocks, and the first value is 12. In this case, 12 is a common multiple of the quantity 4 of resource blocks in the first resource block group and the second value 3.

In addition, the second value 3 is a common divisor of the first values: 6, 9, and 12 in the foregoing three bandwidths.

It should be noted that in the first bandwidth set or the second bandwidth set or the third bandwidth set in Table 2, a magnitude of the first value in the sTTI system is not unique. For example, in the second bandwidth set, the first value may be 6. In this case, the first value 6 is a common multiple of the quantity 3 of resource blocks in the second resource block group and the second value 3. In addition, the second value 3 is also a common divisor of the first values: 6, 6, and 12 in the foregoing three bandwidths. In other words, the magnitude of the first value is not limited in this embodiment of the present invention.

In addition, a network device determines a magnitude of the second value based on channel estimation complexity and a channel frequency selection feature. How to determine the magnitude of the second value is not described in detail in this embodiment of the present invention.

Figure 3:
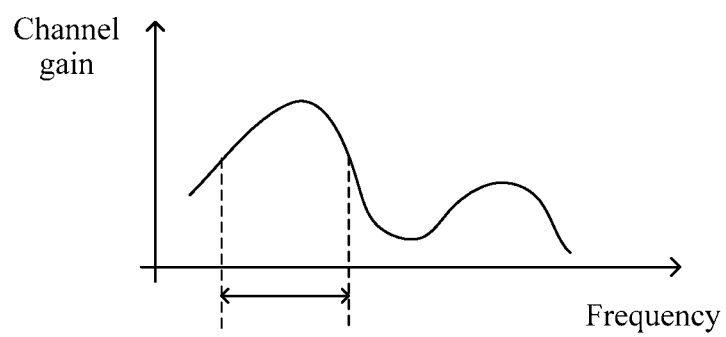
FIG. 3 is a schematic diagram of a frequency selective channel in the prior art.

The channel frequency selection feature indicates that a channel has different channel gains in different frequency bands. As shown in FIG. 3, a stronger frequency selection feature leads to a weaker channel correlation on different frequencies. In addition, a larger frequency band between two frequencies indicates a weaker channel correlation. Therefore, it may be learned that in a weak frequency selective channel or a non-frequency selective channel, because channel gains at an extremely large bandwidth may be considered to be strongly correlated or even the same, same precoding may be performed on a same channel in these different frequency bands, and a PRG size may be set to be relatively large. On the contrary, in a strong frequency selective channel, even channels of several adjacent resource blocks may differ greatly. A performance loss is caused if same precoding is performed on these resource blocks. Therefore, in this case, a PRG size should be set to be relatively small.

In the foregoing example, the network device enlarges an RBG size in the sTTI system to be three times an RBG size in the LTE system, so that a quantity of bits required for bit mapping in the sTTI system is reduced to approximately ⅓ of a quantity of bits in the LTE system, thereby reducing a quantity of bits of DCI of the network device, and improving downlink data transmission efficiency. As shown in Table 2, for example, the downlink bandwidth is 64 to 110 RBs. There are 25 bits for bit mapping in the LTE system, and there are 9 bits for bit mapping in the sTTI system.

In addition, PRG sizes in the three bandwidth sets are the same, so that channel estimation design complexity is reduced. It is determined that PRG size=3, so that desired precoding performance can be obtained in the strong frequency selective channel.

In another example, the network device determines that the preset bandwidth threshold is 10 resource blocks, the first time length includes two OFDM symbols or three OFDM symbols or seven OFDM symbols, and the second time length is one millisecond. In this case, the network device classifies bandwidths having more than 10 resource blocks into a fourth bandwidth set and a fifth bandwidth set, the fourth bandwidth set includes 11 to 63 resource blocks, and the fifth bandwidth set includes 64 to 110 resource blocks.

When the second value is 6, in other words, the precoding resource block group includes six resource blocks, a first value corresponding to the fourth bandwidth set is 6, and a resource block group with the second time length includes two or three resource blocks; and a first value corresponding to the fifth bandwidth set is 12, and a resource block group with the second time length includes four resource blocks.

Table 3 is shown below:

TABLE 3

| Downlink bandwidth (RB) | RBG size (RB) | | Bit mapping | | PRG size (RB) | |
|---|---|---|---|---|---|---|
| | LTE system | sTTI system | LTE system | sTTI system | LTE system | sTTI system |
| 11 to 63 | 2 or 3 | 6 | 6 to 21 | 2 to 11 | 2 or 3 | 6 |
| 64 to 110 | 4 | 12 | 16 to 28 | 6 to 10 | 2 | 6 |

As shown in Table 3, in the sTTI system, the network device determines that the PRG size, namely, the second value is 6. When the downlink bandwidth is 11 to 63 RBs, the second resource block group includes two or three resource blocks, and the first value is 6. In this case, 6 is a common multiple of the quantity 2 or 3 of resource blocks in the second resource block group and the second value 6. When the downlink bandwidth is 64 to 110 RBs, the second resource block group includes four resource blocks, and the first value is 12. In this case, 12 is a common multiple of the quantity 4 of resource blocks in the second resource block group and the second value 6.

In addition, the second value 6 is a common divisor of the first values: 6 and 12 in the foregoing two bandwidths.

In the foregoing example, the network device enlarges an RBG size in the sTTI system to be two or three times an RBG size in the LTE system, so that a quantity of bits required for bit mapping in the sTTI system is reduced to approximately ⅓ to ½ of a quantity of bits in the LTE system, thereby reducing a quantity of bits of DCI of the network device, and improving downlink data transmission efficiency. In addition, PRG sizes in the two bandwidth sets are the same, so that channel estimation design complexity is reduced. It is determined that PRG size=6, so that desired channel joint estimation performance can be obtained in the weak frequency selective channel.

S403. The network device sends downlink control information, where the downlink control information includes downlink resource allocation information, and the downlink resource allocation information indicates a first resource block group occupied by downlink data.

S404. The network device sends a demodulation reference signal and the downlink data, where same precoding is performed on the demodulation reference signal and the downlink data in each precoding resource block group occupied by the downlink data.

The downlink resource allocation information indicates that the downlink data occupies a plurality of resource block groups, and each of the resource block groups includes at least one precoding resource block group. Same precoding is performed on the demodulation reference signal and the downlink data in a same precoding resource block group.

It should be noted that a case in which a bandwidth is less than a preset bandwidth threshold 10 is not described in detail in this embodiment of the present invention. A person skilled in the art may learn that as shown in FIG. 1, when the bandwidth is less than 10 resource blocks, both the RBG size and the PRG size in the LTE system are one RB; and when the bandwidth is less than 10 resource blocks, both the RBG size and the PRG size in the sTTI system may also be one RB.

In addition, downlink data transmission between the network device and the terminal device is mainly described in this embodiment of the present invention. However, a person skilled in the art may learn that this embodiment of the present invention is also applicable to data transmission between terminal devices. For example, when data is transmitted between the terminal devices, a control message is sent. This can also reduce DCI overheads. An application scenario is not limited in this embodiment of the present invention.

In a downlink resource allocation type 2, the network device allocates continuous frequency domain resources to the terminal device in units of resource blocks. According to the Shannon information theory, the allocation type requires $\lceil \log_2 C_{n+1}^2 \rceil$ bits, and N is a bandwidth. For example, the bandwidth is 25 RBs, in other words, N=25. In this case, the type 2 requires 9 bits. A relationship between a downlink bandwidth in the type 2 and the type 2 is shown in Table 4.

TABLE 4

| Downlink bandwidth (RB) | Type 0 | | Type 2 | |
|---|---|---|---|---|
| | RBG | Quantity of bits for resource allocation | RBG | Quantity of bits for resource allocation |
| 15 | 6 | 3 | 4 | 3 |
| 25 | 6 | 5 | 4 | 5 |
| 50 | 9 | 6 | 6 | 6 |
| 75 | 12 | 7 | 8 | 6 |
| 100 | 12 | 9 | 8 | 7 |

As shown in Table 4, quantities of bits required by the type 2 and the type 0 are the same or similar in various bandwidths. This helps the network device schedule different resource allocation types by using DCI with a same time length, so as to reduce a quantity of times of blind detection of the terminal device.

Specifically, the network device schedules the different resource allocation types by using the DCI with the same time length. The DCI includes 1 bit indication information that indicates a resource allocation type used for transmission.

FIG. 5 is a schematic flowchart of another communication method according to an embodiment of the present invention. As shown in FIG. 5, the method includes S501 and S502.

S501. A terminal device determines that a downlink bandwidth belongs to one of N downlink bandwidth sets, where each of the N downlink bandwidth sets is corresponding to one first value and one second value, at least two first values corresponding to at least two of the N downlink bandwidth sets are different, each of the N downlink bandwidth sets is corresponding to a same second value, the second value is a common divisor of N first values corresponding to the N downlink bandwidth sets, and N is an integer greater than or equal to 2.

S502. The terminal device determines that a quantity of resource blocks included in a first resource block group is a first value corresponding to the downlink bandwidth set to which the downlink bandwidth belongs, and the terminal device determines that a quantity of resource blocks included in a precoding resource block group is the second value.

In this case, when any downlink bandwidth in the N downlink bandwidth sets is greater than a preset bandwidth threshold, and a time domain resource occupied by the downlink data is a first time length, the first value is a common multiple of a quantity of resource blocks in a second resource block group and the second value for a same downlink bandwidth set.

The second resource block group is a resource block group in which a transmission time interval is a second time length, the first value is a quantity of resource blocks in a resource block group in which a transmission time interval is the first time length, and the first time length is less than the second time length.

In an example, the preset bandwidth threshold is 10 resource blocks, the first time length includes two OFDM symbols or three OFDM symbols or seven OFDM symbols, and the second time length is one millisecond. The N downlink bandwidth sets include a first bandwidth set, a second bandwidth set, and a third bandwidth set, the first bandwidth set includes 11 to 26 resource blocks, the second bandwidth set includes 27 to 63 resource blocks, and the third bandwidth set includes 64 to 110 resource blocks.

When the second value is 3, in other words, the precoding resource block group includes three resource blocks, a first value corresponding to the first bandwidth set is 6, and a resource block group with the second time length includes two resource blocks; a first value corresponding to the second bandwidth set is 9, and a resource block group with the second time length includes three resource blocks; and a first value corresponding to the third bandwidth set is 12, and a resource block group with the second time length includes four resource blocks.

In another example, the preset bandwidth threshold is 10 resource blocks, the first time length includes two OFDM symbols or three OFDM symbols or seven OFDM symbols, and the second time length is one millisecond. The N downlink bandwidth sets include a fourth bandwidth set and a fifth bandwidth set, the fourth bandwidth set includes 11 to 63 resource blocks, and the fifth bandwidth set includes 64 to 110 resource blocks.

When the second value is 6, in other words, the precoding resource block group includes six resource blocks, a first value corresponding to the fourth bandwidth set is 6, and a resource block group with the second time length includes two or three resource blocks; and a first value corresponding to the fifth bandwidth set is 12, and a resource block group with the second time length includes four resource blocks.

S503. The terminal device receives downlink control information, where the downlink control information includes downlink resource allocation information, and the downlink resource allocation information indicates a first resource block group occupied by downlink data.

S504. The terminal device receives a demodulation reference signal and the downlink data, where same precoding is performed on the demodulation reference signal and the downlink data in each precoding resource block group occupied by the downlink data.

For matters that are not described in this embodiment of the present invention, refer to FIG. 4 and a text part described in FIG. 4. Details are not described herein again.

The foregoing mainly describes the solutions in the embodiments of the present invention from a perspective of interaction between network elements. It may be understood that to implement the foregoing function, the network elements, such as the network device and the terminal device, include a corresponding hardware structure and/or software module for performing respective function. A person skilled in the art could be easily aware that units and algorithm steps in the examples described with reference to the embodiments disclosed in this specification can be implemented in a form of hardware or a combination of hardware and computer software in the present invention. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of the present invention.

In the embodiments of the present invention, functional unit division may be performed on the network device, the terminal device, and the like based on the foregoing method examples. For example, each functional unit may be obtained through division based on a corresponding function, or two or more functions may be integrated into one processing unit. The integrated unit may be implemented in a form of hardware, or may be implemented in a form of a software functional unit. It should be noted that unit division in the embodiments of the present invention is an example, and is merely logical function division. There may be another division manner in actual implementation.

Figure 6A:
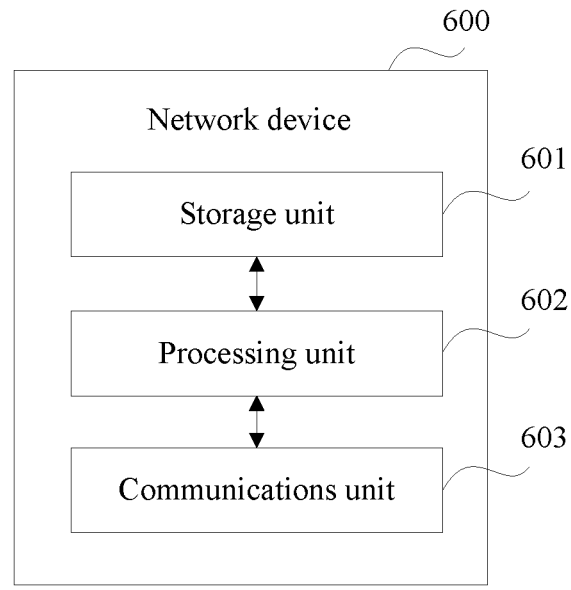
FIG. 6a is a schematic structural diagram of a network device according to an embodiment of the present invention.

When an integrated unit is used, FIG. 6a is a possible schematic structural diagram of a network device in the foregoing embodiments. The network device 600 includes a processing unit 602 and a communications unit 603. The processing unit 602 is configured to control and manage an action of the network device. For example, the processing unit 602 is configured to support the network device in performing steps S401 and S402 in FIG. 4, and/or is configured to perform another process of the technology described in this specification. The communications unit 603 is configured to support communication between the network device and another network entity, for example, communication with the terminal device shown in FIG. 4. The network device may further include a storage unit 601, configured to store program code and data of the network device.

The processing unit 602 may be a processor or a controller, for example, a central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. The processing unit 602 may implement or execute various example logic blocks, modules, and circuits that are described with reference to content disclosed in the present invention. Alternatively, the processor may be a combination for implementing a computing function, for example, a combination including one or more microprocessors or a combination of a DSP and a microprocessor. The communications unit 603 may be a communications interface, a transceiver, a transceiver circuit, or the like. The communications interface is a general term, and may include one or more interfaces. The storage unit 601 may be a memory.

Figure 6B:
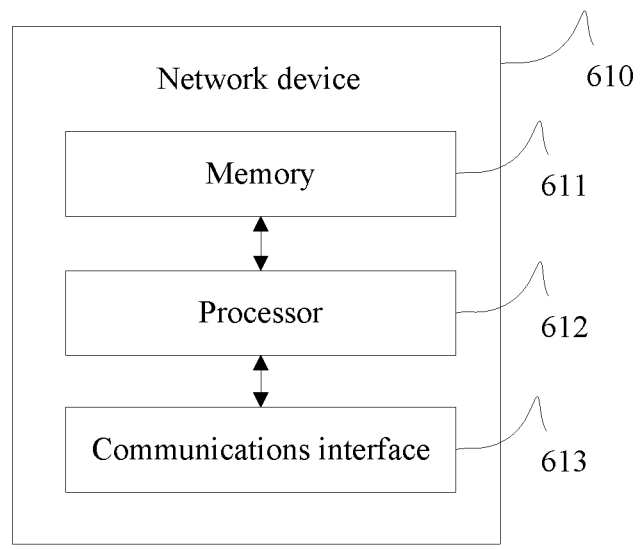
FIG. 6b is a schematic structural diagram of an entity of a network device according to an embodiment of the present invention.

When the processing unit 602 is a processor, the communications unit 603 is a communications interface, and the storage unit 601 is a memory, the network device in this embodiment of the present invention may be a network device shown in FIG. 6b.

As shown in FIG. 6b, the network device 610 includes a processor 612, a communications interface 613, and a memory 611. The memory 611 stores a computer program and instructions for the network device, the processor 612 executes the computer program and the instructions, and the communications interface 613 is used for communication between the network device and an external device.

Figure 7A:
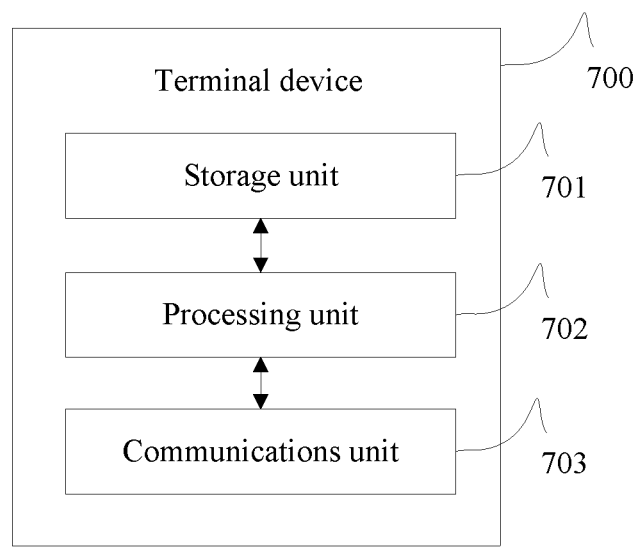
FIG. 7a is a schematic structural diagram of a terminal device according to an embodiment of the present invention.

When an integrated unit is used, FIG. 7a is a possible schematic structural diagram of a terminal device in the foregoing embodiments. The terminal device includes a processing unit 702 and a communications unit 703. The processing unit 702 is configured to control and manage an action of the terminal device. For example, the processing unit 702 is configured to support the terminal device in performing steps S501 and S502 in FIG. 5, and/or is configured to perform another process of the technology described in this specification. The communications unit 703 is configured to support communication between the terminal device and another network entity, for example, communication with the network device shown in FIG. 4. The terminal device may further include a storage unit 701, configured to store program code and data of the terminal device.

The processing unit 702 may be a processor or a controller, for example, a CPU, a general-purpose processor, a DSP, an ASIC, an FPGA or another programmable logic device, a transistor logic device, a hardware component, or any combination thereof. The processing unit 702 may implement or execute various example logic blocks, modules, and circuits that are described with reference to content disclosed in the present invention. Alternatively, the processor may be a combination for implementing a computing function, for example, a combination including one or more microprocessors or a combination of a DSP and a microprocessor. The communications unit 703 may be a communications interface, a transceiver, a transceiver circuit, or the like. The communications interface is a general term, and may include one or more interfaces. The storage unit 701 may be a memory.

Figure 7B:
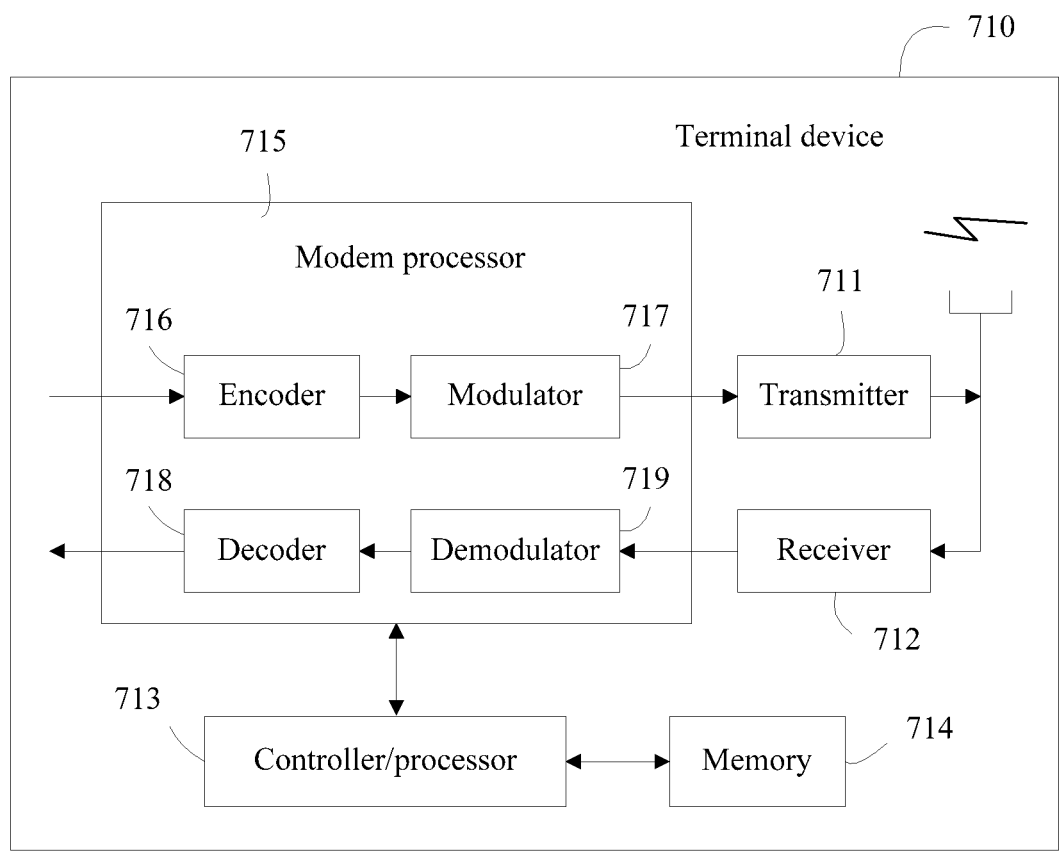
FIG. 7b is a schematic structural diagram of an entity of a terminal device according to an embodiment of the present invention.

When the processing unit 702 is a processor, the communications unit 703 is a transceiver, and the storage unit 701 is a memory, the terminal device in this embodiment of the present invention may be a terminal device shown in FIG. 7b.

FIG. 7b is a simplified schematic diagram of a possible designed structure of a terminal device according to an embodiment of the present invention. The terminal device 710 includes a transmitter 711, a receiver 712, and a processor 713. The processor 713 may also be a controller, and is represented as a "controller/processor 713" in FIG. 7b. Optionally, the terminal 710 may further include a modem processor 715, and the modem processor 715 may include an encoder 716, a modulator 717, a decoder 718, and a demodulator 719.

In an example, the transmitter 711 adjusts (for example, through analog conversion, filtering, amplification, and up-conversion) an output sampling and generates an uplink signal. The uplink signal is transmitted to the network device in the foregoing embodiments by using an antenna. In a downlink, the antenna receives a downlink signal transmitted by the network device in the foregoing embodiments. The receiver 712 adjusts (for example, through filtering, amplification, down-conversion, and digitization) a signal received from the antenna and provides an input sampling. In the modem processor 715, the encoder 718 receives service data and a signaling message that are to be sent in an uplink, and processes (for example, through formatting, encoding, and interleaving) the service data and the signaling message. The modulator 717 further processes (for example, through symbol mapping and modulation) encoded service data and an encoded signaling message, and provides an output sampling. The demodulator 719 processes (for example, through demodulation) the input sampling and provides symbol estimation. The decoder 718 processes (for example, through de-interleaving and decoding) the symbol estimation and provides decoded data and a decoded signaling message that are to be sent to the terminal device 710. The encoder 716, the modulator 717, the demodulator 719, and the decoder 718 may be implemented by the combined modem processor 715. These units perform processing based on a radio access technology (for example, an access technology of LTE or another evolution system) used by a radio access network. It should be noted that when the terminal device 710 does not include the modem processor 715, the foregoing functions of the modem processor 715 may also be implemented by the processor 713.

Further, the terminal device 710 may include a memory 714, and the memory 714 is configured to store program code and data of the terminal device 710.

An embodiment of the present invention provides a computer storage medium, configured to store computer software instructions used by the network device described in FIG. 4, and the computer software instructions include a program designed to execute the foregoing aspect.

An embodiment of the present invention provides a computer storage medium, configured to store computer software instructions used by the terminal device described in FIG. 5, and the computer software instructions include a program designed to execute the foregoing aspect.

An embodiment of the present invention provides a computer program product that includes instructions, and when the instructions are executed by a computer, the instructions enables the computer to perform a function performed by the network device in the method design in FIG. 4.

An embodiment of the present invention provides a computer program product that includes instructions, and when the instructions are executed by a computer, the instructions enables the computer to perform a function performed by the terminal device in the method design in FIG. 5.

In the embodiments of the present invention, quantities of precoding resource blocks in various bandwidths are set to be the same, and a quantity of resource blocks in a resource block group is increased, so that not only a transmission time interval is shortened, but also a quantity of bits occupied by the downlink control information is reduced, thereby reducing overheads of the downlink control information of the network device, and improving data transmission efficiency of the network device.

Method or algorithm steps described with reference to the content disclosed in the embodiments of the present invention may be implemented by hardware, or may be implemented by a processor executing software instructions. The software instructions may include a corresponding software module. The software module may be stored in a random access memory (random access memory, RAM), a flash memory, a read-only memory (read only memory, ROM), an erasable programmable read only memory (erasable programmable ROM, EPROM), an electrically erasable programmable read only memory (electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a terminal device. Certainly, the processor and the storage medium may exist in the terminal device as discrete components.

A person skilled in the art should be aware that in the foregoing one or more examples, functions described in the embodiments of the present invention may be implemented by hardware, software, firmware, or any combination thereof. When the functions are implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and beneficial effects of the embodiments of the present invention are further described in detail in the foregoing specific implementations. It should be understood that the foregoing descriptions are merely specific implementations of the embodiments of the present invention, but are not intended to limit the protection scope of the embodiments of the present invention. Any modification, equivalent replacement, or improvement made based on the technical solutions in the embodiments of the present invention shall fall within the protection scope of the embodiments of the present invention.

What is claimed is:

1. A communication method, wherein the method comprises:

determining, by a terminal device, that a downlink bandwidth belongs to one of N downlink bandwidth sets in a system applying a shortened transmission time interval, wherein each downlink bandwidth set of the N downlink bandwidth sets corresponds to one first value and one second value, wherein at least two first values corresponding to at least two downlink bandwidth sets of the N downlink bandwidth sets are different, wherein each downlink bandwidth set of the N downlink bandwidth sets corresponds to a same second value, wherein the second value is a common divisor of N first values corresponding to the N downlink bandwidth sets, and wherein N is an integer greater than or equal to 2;

determining, by the terminal device, that a quantity of resource blocks comprised in a first resource block group is a first value corresponding to the downlink bandwidth set to which the downlink bandwidth belongs, and determining, by the terminal device, that a quantity of resource blocks comprised in a precoding resource block group is the second value, wherein:

in response to a time domain resource occupied by downlink data being a first time length, the first value is a common multiple of a quantity of resource blocks in a second resource block group and the second value for a same downlink bandwidth set; and the second resource block group is a resource block group in which a transmission time interval is a second time length, the first value is a quantity of resource blocks in a resource block group in which a transmission time interval is the first time length, and the first time length is less than the second time length;

receiving, by the terminal device, downlink control information, wherein the downlink control information comprises downlink resource allocation information, and wherein the downlink resource allocation information indicates a first resource block group occupied by the downlink data; and receiving, by the terminal device, a demodulation reference signal and the downlink data, wherein same precoding is performed on the demodulation reference signal and the downlink data in each precoding resource block group occupied by the downlink data.

2. The method according to claim 1, wherein any bandwidth in any one of the N downlink bandwidth sets is greater than a preset bandwidth threshold.

3. The method according to claim 2, wherein the preset bandwidth threshold is 10 resource blocks.

4. The method according to claim 1, wherein the first time length comprises two orthogonal frequency division multiplexing (OFDM) symbols or three OFDM symbols or seven OFDM symbols, and wherein the second time length is one millisecond.

5. The method according to claim 1, wherein the N downlink bandwidth sets comprise a first bandwidth set, a second bandwidth set, and a third bandwidth set, wherein the first bandwidth set comprises 11 to 26 resource blocks, wherein the second bandwidth set comprises 27 to 63 resource blocks, and wherein the third bandwidth set comprises 64 to 110 resource blocks.

6. The method according to claim 1, wherein N is a positive integer greater than or equal to 3.

7. The method according to claim 1, wherein the N downlink bandwidth sets are continuous.

8. A communications apparatus, comprising:
a memory storing program instructions; and at least one processor coupled to the memory, wherein the program instructions, when executed by the at least one processor, cause the communications apparatus to:
  determine that a downlink bandwidth belongs to one of N downlink bandwidth sets in a system applying a shortened transmission time interval, wherein each downlink bandwidth set of the N downlink bandwidth sets corresponds to one first value and one second value, wherein at least two first values corresponding to at least two downlink bandwidth sets of the N downlink bandwidth sets are different, wherein each downlink bandwidth set of the N downlink bandwidth sets corresponds to a same second value, wherein the second value is a common divisor of N first values corresponding to the N downlink bandwidth sets, and wherein N is an integer greater than or equal to 2;
  determine that a quantity of resource blocks comprised in a first resource block group is a first value corresponding to the downlink bandwidth set to which the downlink bandwidth belongs, and determine that a quantity of resource blocks comprised in a precoding resource block group is the second value, wherein:
    in response to a time domain resource occupied by downlink data being a first time length, the first value is a common multiple of a quantity of resource blocks in a second resource block group and the second value for a same downlink bandwidth set; and
    the second resource block group is a resource block group in which a transmission time interval is a second time length, the first value is a quantity of resource blocks in a resource block group in which a transmission time interval is the first time length, and the first time length is less than the second time length;
  receive downlink control information, wherein the downlink control information comprises downlink resource allocation information, and wherein the downlink resource allocation information indicates a first resource block group occupied by the downlink data; and
  receive a demodulation reference signal and the downlink data, wherein same precoding is performed on the demodulation reference signal and the downlink data in each precoding resource block group occupied by the downlink data.

9. The communications apparatus according to claim 8, wherein any bandwidth in any one of the N downlink bandwidth sets is greater than a preset bandwidth threshold.

10. The communications apparatus according to claim 9, wherein the preset bandwidth threshold is 10 resource blocks.

11. The communications apparatus according to claim 8, wherein the first time length comprises two orthogonal frequency division multiplexing (OFDM) symbols or three OFDM symbols or seven OFDM symbols, and wherein the second time length is one millisecond.

12. The communications apparatus according to claim 8, wherein the N downlink bandwidth sets comprise a first bandwidth set, a second bandwidth set, and a third bandwidth set, wherein the first bandwidth set comprises 11 to 26 resource blocks, wherein the second bandwidth set comprises 27 to 63 resource blocks, and wherein the third bandwidth set comprises 64 to 110 resource blocks.

13. The communications apparatus according to claim 8, wherein N is a positive integer greater than or equal to 3.

14. The communications apparatus according to claim 8, wherein the N downlink bandwidth sets are continuous.

15. The communications apparatus according to claim 8, wherein the communications apparatus is a terminal device.

16. A non-transitory computer-readable storage medium comprising instructions which, when executed by a computer hardware of a communication apparatus, cause the communication apparatus to:
  determine that a downlink bandwidth belongs to one of N downlink bandwidth sets in a system applying a shortened transmission time interval, wherein each downlink bandwidth set of the N downlink bandwidth sets corresponds to one first value and one second value, wherein at least two first values corresponding to at least two downlink bandwidth sets of the N downlink bandwidth sets are different, wherein each of the N downlink bandwidth sets corresponds to a same second value, wherein the second value is a common divisor of N first values corresponding to the N downlink bandwidth sets, and wherein N is an integer greater than or equal to 2;
  determine that a quantity of resource blocks comprised in a first resource block group is a first value corresponding to the downlink bandwidth set to which the downlink bandwidth belongs, and determine that a quantity of resource blocks comprised in a precoding resource block group is the second value, wherein:
    in response to a time domain resource occupied by downlink data being a first time length, the first value is a common multiple of a quantity of resource blocks in a second resource block group and the second value for a same downlink bandwidth set; and
    the second resource block group is a resource block group in which a transmission time interval is a second time length, the first value is a quantity of resource blocks in a resource block group in which a transmission time interval is the first time length, and the first time length is less than the second time length;
  receive downlink control information, wherein the downlink control information comprises downlink resource allocation information, and wherein the downlink resource allocation information indicates a first resource block group occupied by the downlink data; and
  receive a demodulation reference signal and the downlink data, wherein same precoding is performed on the demodulation reference signal and the downlink data in each precoding resource block group occupied by the downlink data.

17. The non-transitory computer-readable storage medium according to claim 16, wherein any bandwidth in any one of the N downlink bandwidth sets is greater than a preset bandwidth threshold.

18. A communications apparatus, comprising:
  a memory storing program instructions; and
  at least one processor coupled to the memory, wherein the program instructions, when executed by the at least one processor, cause the communications apparatus to:
    determine that a downlink bandwidth belongs to one of N downlink bandwidth sets in a system applying a shortened transmission time interval, wherein each downlink bandwidth set of the N downlink bandwidth sets corresponds to one first value and one second value, wherein at least two first values corresponding to at least two downlink bandwidth sets of the N downlink bandwidth sets are different, each downlink bandwidth set of the N downlink bandwidth sets corresponds to a same second value, wherein the second value is a common divisor of N first values corresponding to the N downlink bandwidth sets, and wherein N is an integer greater than or equal to 2;

determine that a quantity of resource blocks comprised in a first resource block group is a first value corresponding to the downlink bandwidth set to which the downlink bandwidth belongs, and determine that a quantity of resource blocks comprised in a precoding resource block group is the second value, wherein:

in response to a time domain resource occupied by downlink data being a first time length, the first value is a common multiple of a quantity of resource blocks in a second resource block group and the second value for a same downlink bandwidth set; and the second resource block group is a resource block group in which a transmission time interval is a second time length, the first value is a quantity of resource blocks in a resource block group in which a transmission time interval is the first time length, and the first time length is less than the second time length;

send downlink control information, wherein the downlink control information comprises downlink resource allocation information, and wherein the downlink resource allocation information indicates a first resource block group occupied by the downlink data; and send a demodulation reference signal and the downlink data, wherein same precoding is performed on the demodulation reference signal and the downlink data in each precoding resource block group occupied by the downlink data.

19. The communications apparatus according to claim 18, wherein the first time length comprises two orthogonal frequency division multiplexing (OFDM) symbols or three OFDM symbols or seven OFDM symbols, and wherein the second time length is one millisecond.

20. A communication method, wherein the method comprises:

determining, by a network device, that a downlink bandwidth belongs to one of N downlink bandwidth sets in a system applying a shortened transmission time interval, wherein each downlink bandwidth set of the N downlink bandwidth sets corresponds to one first value and one second value, wherein at least two first values corresponding to at least two downlink bandwidth sets of the N downlink bandwidth sets are different, each downlink bandwidth set of the N downlink bandwidth sets corresponds to a same second value, wherein the second value is a common divisor of N first values corresponding to the N downlink bandwidth sets, and wherein N is an integer greater than or equal to 2;

determining, by the network device, that a quantity of resource blocks comprised in a first resource block group is a first value corresponding to the downlink bandwidth set to which the downlink bandwidth belongs, and determining, by the network device, that a quantity of resource blocks comprised in a precoding resource block group is the second value, wherein:

in response to a time domain resource occupied by downlink data being a first time length, the first value is a common multiple of a quantity of resource blocks in a second resource block group and the second value for a same downlink bandwidth set; and the second resource block group is a resource block group in which a transmission time interval is a second time length, the first value is a quantity of resource blocks in a resource block group in which a transmission time interval is the first time length, and the first time length is less than the second time length;

sending, by the network device, downlink control information, wherein the downlink control information comprises downlink resource allocation information, and wherein the downlink resource allocation information indicates a first resource block group occupied by the downlink data; and sending, by the network device, a demodulation reference signal and the downlink data, wherein same precoding is performed on the demodulation reference signal and the downlink data in each precoding resource block group occupied by the downlink data.

* * * * *